Dec. 24, 1946.  W. R. P. DELANO  2,413,101
SOLAR STILL WITH NONFOGGING WINDOW
Filed Oct. 20, 1943
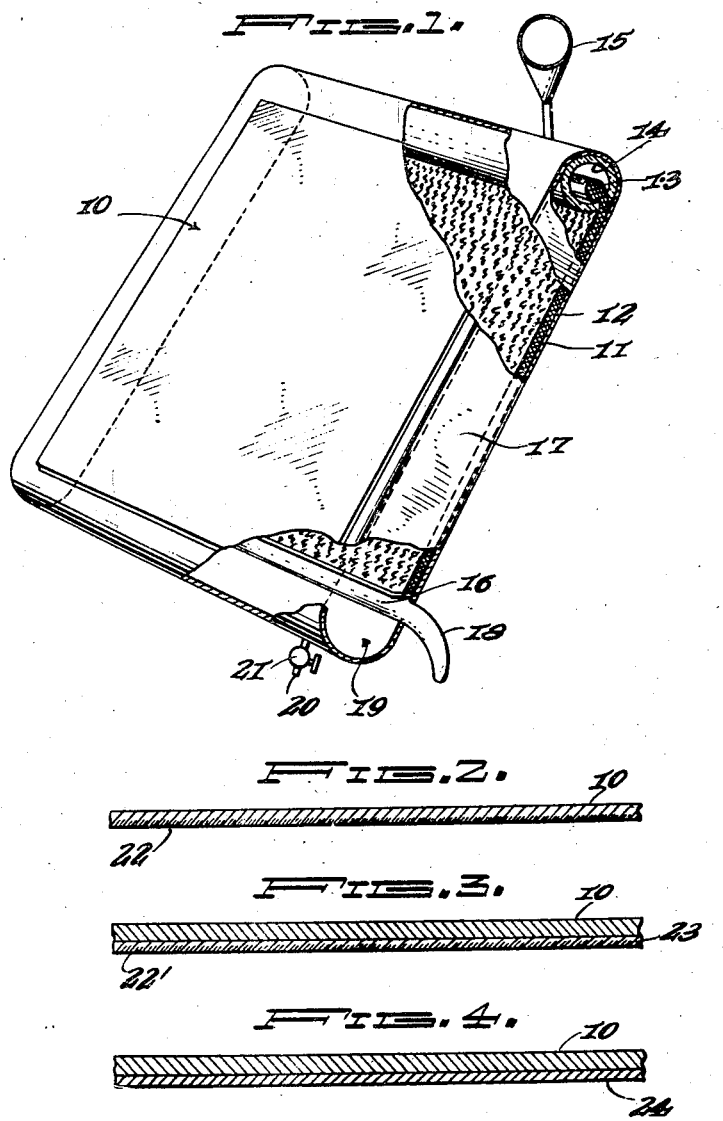
INVENTOR.
WILLIAM R. P. DELANO
BY Worth Wade
ATTORNEY.

Patented Dec. 24, 1946

2,413,101

UNITED STATES PATENT OFFICE 2,413,101

SOLAR STILL WITH NONFOGGING WINDOW

William R. P. Delano, Syosset, N. Y., assignor to Gallowhur Chemical Corporation, New York, N. Y., a corporation of Vermont Application October 20, 1943, Serial No. 507,002

6 Claims. (Cl. 202—234)

1

This invention relates in general to distillation and in particular to an apparatus for distilling liquids, in particular sea water, and to correlated improvements designed to enhance the utility of such an apparatus.

The need of a simple and convenient method of distilling impure water, such as sea water, for the production of fresh water for drinking and the like has long been recognized, but this need becomes increasingly important during times of war when the destruction of ships and airplanes at sea forces the crews to take to lifeboats, rafts and floats. In such small lifesaving craft space is limited, methods of heating either non-existent difficult to provide and all weight must be reduced to a minimum.

When the apparatus utilizes solar radiation as a source of energy it should be anti-fogging. If the moisture evaporates from one surface and condenses upon the inner surface of a transparent sheet enclosing the liquid layer, there is the tendency for droplets of water to form on the surface, which droplets diffuse the light rays and thus decrease the efficiency of the apparatus. This is particularly serious when the apparatus must be made of waterproof hydrophobic material, that is water liberating sheet materials because such materials are not readily watered by the condensation so that the condensation tends to form droplets instead of spreading and running down as a thin layer of liquid.

Accordingly, it is the general object of the present invention to provide an apparatus for the distillation of liquids, in particular, sea water which will be efficient in the utilization of solar radiation in distilling liquids.

A specific object of the invention is to prevent the condensation of the distillate in the form of droplets which might decrease the efficiency of the apparatus when utilizing solar radiation as a source of energy.

It is a further object of the invention to provide a simple means for distilling sea water which is adapted for use on small lifesaving craft.

Other objects of the invention will in part be obvious and will in part appear hereinafter.

According to the present invention there is provided an apparatus for distilling liquids, in particular sea water for the production of fresh water, comprising in combination a layer of liquid absorbent material spaced from a sheet of transparent hydrophobic material and means for exposing the layer of absorbent material to solar radiation passing through the transparent sheet, whereby the liquid in the absorbent layer is vaporized and condenses on the inner surface of the transparent material, the inner surface of said material being combined with a layer of hydrophilic material whereby the condensation of the liquid in the form of droplets thereon is prevented. In the following specification and claims the expression "combined with" is used to indicate that the hydrophobic transparent sheet material is coated with, or formed superficially of, a hydrophilic material.

For a more complete understanding of the nature and objects of the invention, reference should be made to the accompanying drawing in which:

Figure 1 is a front elevation partly in section of one embodiment of the apparatus of the invention, and Figures 2, 3 and 4 are as many views in cross-section of the transparent sheet material or front wall of the apparatus shown in Figure 1. Referring to Figure 1 the apparatus comprised is in the form of a closed container having front wall 10 formed of a transparent hydrophobic sheet material and the back wall 11 supporting a layer 12 of liquid absorbent material the open edge of which 13 extends into a tubular liquid reservoir 14 which is supplied with liquid through the funnel 15. The lower edge of the layer 12 is sealed within the upper seam of a tubular member 16 one end of which projects from the side wall 17 in the form of a spout 18. If desired the side wall 17 may be made of rigid material to properly space the front wall from the absorbent layer 17. The space 19 at the base of the container may be considered as a reservoir for the distillate which may be drained off through the tube 20 which is provided with a valve clamp 21. To operate the apparatus the liquid to be distilled is passed into the funnel 15 and then passed into the tube 14 from which it flows by capillary action and saturates the layer 12. Any excess liquid in the layer 12 is drained from the tube 16 through the spout 18. When the apparatus is so disposed that the front wall 10 is normal to the sun's rays the layer 12 will be heated causing evaporization of the liquid condensed therein which vapor will condense upon the inner surface of the front wall 10. It is desired that the liquid thus condensing on the inner surface of the front wall should flow rapidly and smoothly down the wall and collect in the reservoir 19 but it is desired to have the condensate form droplets upon the inner surface of the wall 10.

Therefore the inner surface of the wall 10 is combined with hydrophilic material. There is shown in Figure 2 a cross-section of one embodiment of the front wall 10 which comprises a transparent sheet material formed of an organic plastic material which is saponifiable. The superficial layer 22 of the inner surface is saponified to form a thin, transparent co-extensive layer of hydrophilic material resulting from the saponification. In that embodiment shown in Figure 3 the transparent sheet material 11 formed of hydrophobic material is united by heat-sealing or by an adhesive or by coating with a film-forming layer 23 formed of a saponified organic plastic material. The film 23 is then saponified either superficially or throughout its thickness to produce a hydrophilic layer 22. There is shown in Figure 4 another embodiment in which the transparent sheet 10 is formed of an organic saponifiable organic plastic material which is united by heat-sealing, by an adhesive or by coating with a layer 24 of a hydrophilic material.

The transparent sheet

Since the transparent sheet 10 divides the warm moist air of the interior from the cool dry air on the outside of the window, there will be normally a tendency of the window to become fogged by the condensation of droplets of water on the inner surface. Such droplets diffuse the light and decrease the radiation absorbed by the layer of absorbent material. Accordingly, it is desirable to retard or prevent fogging of the transparent window. This may be accomplished by forming the window of a transparent material combined on one or both sides with a layer of water-absorbent, that is hydrophilic material, which absorbs the condensed water and prevents it from remaining as individual droplets. For example, when the sheet 10 of transparent material is formed of a saponifiable material, such, for example, as a cellulose ester or a synthetic resin formed from an ester such as vinyl acetate, vinyl chloride, methylmethacrylate, and glycerol-polybasic acid resins, such saponifiable materials may be superficially saponified by treatment with an inorganic alkali or an organic base to form a superficial layer of hydrophilic material. Alternatively, when the transparent window is formed of a non-saponifiable material, it may be coated with a hydrophilic film-forming material, such, for example, as viscose, gelatin, casein, polyvinyl alcohol, or the like, or it may be coated with a saponifiable material and the coating then saponified. Alternatively, the window may be laminated on interior and/or exterior to a self-sustaining film formed of a hydrophilic transparent material, such, for example, as Cellophane, gelatine, polyvinyl alcohol sheeting, and the like, the film being adhesively united to the transparent window by a suitable water-insoluble adhesive. Saponification may be in predetermined areas by masking the areas which are not to be saponified by means of a layer of paraffin which resists the saponification.

The absorbent layer

For the layer 12 of absorbent material, there may be employed a layer of a viscose sponge, a pile fabric, a layer of inter-felted fibres such, for example, as textile felt or a soft, porous paper which has been sized with a water-insoluble substance such, for example, as casein, a resin or a cellulose ester which does not disintegrate when wet. Since layer 12 should be capable of being washed and wrung out, it is preferably formed of a material having a sufficient tensile strength for this purpose, that is, a textile fabric or felt, or sponge.

The absorbent layer is preferably colored black to render it more heat-absorbent and this may be done by dyeing or pigmenting the absorbent material with a suitable black dye or carbon black. To insure that the fresh water is free of harmful bacteria, the absorbent layer is advantageously rendered bacteriostatic or fungistatic and germicidal by combining it, e. g., by impregnation or coating, with a suitable water-insoluble germicide such, for example, as a phenyl mercury compound, finely divided ionized heavy metals, such as silver, copper or gold, or by means of an organic substantially water-insoluble germicide such, for example, as copper napthenates, phenyl mercury chloride, phenyl mercury hydroxy quinoline, and dichlorodihydroxymethane.

All other parts of the apparatus, such as the sheet 18, 25 and 40 may be formed of any flexible non-porous sheet material such, for example, as textile fabrics, felt or paper. Such materials should be stiffened and rendered waterproof by impregnating or coating them with an hydrophobic cellulose ester, cellulose ether, synthetic resin and the like. In general, all such sheet materials should be water impermeable.

The shaping means

When the sheet material is sufficiently self-supporting and rigid, no additional shaping means may be necessary. On the other hand, with flexible sheet material additional shaping means may be provided to give rigidity and to space the wall H or transparent window 35 from the absorbent layer 36, as required. Various means may be used to impart shape and rigidity such, for example, as (a) a plurality of transverse slats of rigid material united to the back wall D of the compartment 26 as described and claimed in the co-pending application Serial No. 500,550 filed August 30, 1943, or (b) by the use of stretching battens as disclosed in my parent co-pending application Serial No. 465,366 filed November 12, 1942, or (c) by inflating the chamber 26 with air or gas as described and claimed in my co-pending U. S. application Serial No. 501,219 filed September 4, 1943.

All other sheet materials used in the apparatus may be formed of any flexible non-porous sheet material such, for example, as an organic plastic, textile fabrics, felt or paper. Such fibrous materials should be stiffened and rendered waterproof by impregnating or coating them with a hydrophobic cellulose ester, cellulose ether, synthetic resin, rubber, and the like. In general, all such sheet materials should be water-impermeable.

Since most organic plastic materials contain residual volatile solvents or volatile plasticizers, they tend to undergo changes in dimension when subjected to such temperatures as are generated by the sun's rays. Therefore, in the now preferred embodiment, the sheet materials, before or after being incorporated in the device, are preheated to shrink them, as described in my copending U. S. applications Serial Nos. 500,882 filed September 2, 1943, and 501,219 filed September 4, 1943.

This application is a continuation-in-part of my co-pending application Serial No. 465,366 filed November 12, 1942, and Serial No. 501,219 filed September 4, 1943.

Having described my invention, what I claim as new and desire to secure by Letters Patent is:

1. In all apparatus for distilling liquids, the combination of, a closed container having at least one side provided with a sheet of transparent hydrophobic material, a layer of liquid-absorbent material within said container spaced from and disposed under said transparent side, means to wet said layer with salt water to be distilled, and a layer of transparent hydrophilic material disposed on the inside surface of said transparent hydrophobic material whereby fogging of the transparent sheet by the condensate is prevented.

2. An apparatus as recited in claim 1 in which the transparent side is formed of a layer of saponifiable material and the inner surface is superficially saponified.

3. An apparatus as recited in claim 1 in which the transparent side is united on its inner surface with a layer of hydrophilic material.

4. An apparatus as recited in claim 1 in which the transparent side is coated with a layer of saponifiable material which is superficially saponified.

5. An apparatus as recited in claim 1 in which the transparent side is coated with a film of a hydrophilic colloid.

6. An apparatus as recited in claim 1 in which the transparent side is united on its inner surface to a co-extensive film of regenerated cellulose.

WILLIAM R. P. DELANO.